United States Patent [19]

Herberg

[11] Patent Number: 5,096,025

[45] Date of Patent: Mar. 17, 1992

[54] TWO-WAY MAGNETIC VALVE WITH BYPASS CONTROL

[75] Inventor: Gerhard Herberg, Menden, Fed. Rep. of Germany

[73] Assignee: August Bilstein GmbH & Co. KG, Ennepetal, Fed. Rep. of Germany

[21] Appl. No.: 540,370

[22] Filed: Jun. 19, 1990

[30] Foreign Application Priority Data

Jun. 29, 1989 [DE] Fed. Rep. of Germany ....... 3921239

[51] Int. Cl.⁵ ............................................... F16F 9/43
[52] U.S. Cl. .................................... 188/299; 188/285
[58] Field of Search ........... 188/299, 285, 282, 322.15, 188/280, 300

[56] References Cited

U.S. PATENT DOCUMENTS

| | | | |
|---|---|---|---|
| 4,084,667 | 4/1978 | Kurrat | 188/285 |
| 4,638,896 | 1/1987 | Poyser | 188/299 |
| 4,854,429 | 8/1989 | Casey | 188/299 |
| 4,923,038 | 5/1990 | Lizell | 188/299 |
| 4,958,704 | 9/1990 | Leiber | 188/299 |
| 4,964,492 | 10/1990 | Joseph | 188/299 |

Primary Examiner—Matthew C. Graham
Attorney, Agent, or Firm—Max Fogiel

[57] ABSTRACT

The invention concerns a two-way magnetic valve for controlling a bypass in a semi-active chassis. A valve slide is accommodated inside the piston of a vibration attenuator, where it slides back and forth subject to an electromagnet.

12 Claims, 1 Drawing Sheet

TWO-WAY MAGNETIC VALVE WITH BYPASS CONTROL

BACKGROUND OF THE INVENTION

The invention concerns a hydraulically regulated and controlled vibration attenuator that is provided with a piston rod accommodated in a cylinder. The attenuating piston on the piston rod divides the cylinder into two compartments that are occupied by attenuating fluid. A bypass parallels the cylinder.

A vehicular attenuation system with an adjustable valve that makes it possible to vary the attenuation as desired during both the suction and the compression stages is known from German OS 3 434 877. An axially movable adjustable valve body is employed in conjunction with at least one pressure-controlled and spring-loaded valve positioned in series with it. The armature of the electromagnet is also a valve body.

An adjustable valve for a vibration attenuator is known from German OS 3 542 097. A slide in this valve can be selectively activated by electromagnets. German Patent 3 348 176 also describes a variable shock absorber that is electromagnetically controlled.

A vibration attenuator that has a control slide and is electromagnetically activated is known from German OS 3 832 625.

German OS 3 800 864 discloses a shock absorber with a constriction that can be varied. The cross-section of the constriction is dictated by way of electromagnetic controls with an annular armature.

None of these doouments, however, disclose mechanisms that can be employed with the "skyhook" principle known in controls technology. When a vehicle travels over an obstacle for example, the force of attenuation will initially have to be varied in only one direction of motion. The wheel must spring into position, with the result that the compression stage of the vibration attenuator must be soft enough to allow the wheel to spring in rapidly. The suction stage of the vibration attenuator must accordingly be hard enough to allow the wheel to spring back out again slowly, attenuating the vibration. A one-way valve that activates both stages can be employed in conjunction with this principle. When for example the vehicle's computer detects a high attenuating-piston speed in the compression-stage direction, it will have to open the valve to keep any impact on the body as weak as possible. What is of course important in this case is for the vibration attenuator to shift over when the attenuation piston is at the upper dead center. It is, however, extremely difficult in the given circumstances to determine the precise upper dead center. The result is constant impacts that are perceptible in the body.

SUMMARY OF THE INVENTION

The object of the present invention is to incorporate the skyhook principle, meaning that any vibration that occurs will be attenuated as rapidly as possible. An acceptable compromise between comfort and safety will of course have to be discovered.

This object is attained in accordance with the invention in that a two-way valve is employed for the bypass for semiactive control of the chassis. Only one direction of motion (suction or compression) can be handled at one time by a two-way valve. The drawbacks that occur with a one-way bypass, the need to shift precisely at dead center in order to avoid compression impacts for example, are absent from the present invention. A bypass that is open during both the suction and the compression stages leads when accordingly activated by the surface of the road to unstable activity on the part of the vehicle. Driving safety accordingly demands shifting a one-way valve as previously described herein. Since a two-way valve on the other hand is designed to be in the correct position when needed and does not have to be shifted over, no compression impact can occur. Another advantage is the compulsory additional control of the bypass by tensioned checkvalves. Furthermore, the cross-section of the bypass can be varied for either the suction or the compression stage. Furthermore, the two-way valve can be adjusted by an electromagnet. And adequate safety will be maintained even if the electromagnet fails because either the suction or the compression stage will remain hard in position depending on the design of the control slide, meaning that one bypass is always closed. The bypass controls will also provide a minimum characteristic. And the slide is inside the piston, which makes the vibration attenuator even more compact.

BRIEF DESCRIPTION OF THE DRAWINGS

One embodiment of the invention will now be described with reference to the sectional views shown in FIG. 1.

DESCRIPTION OF THE PREFERRED EMBODIMENTS

Figure 1:
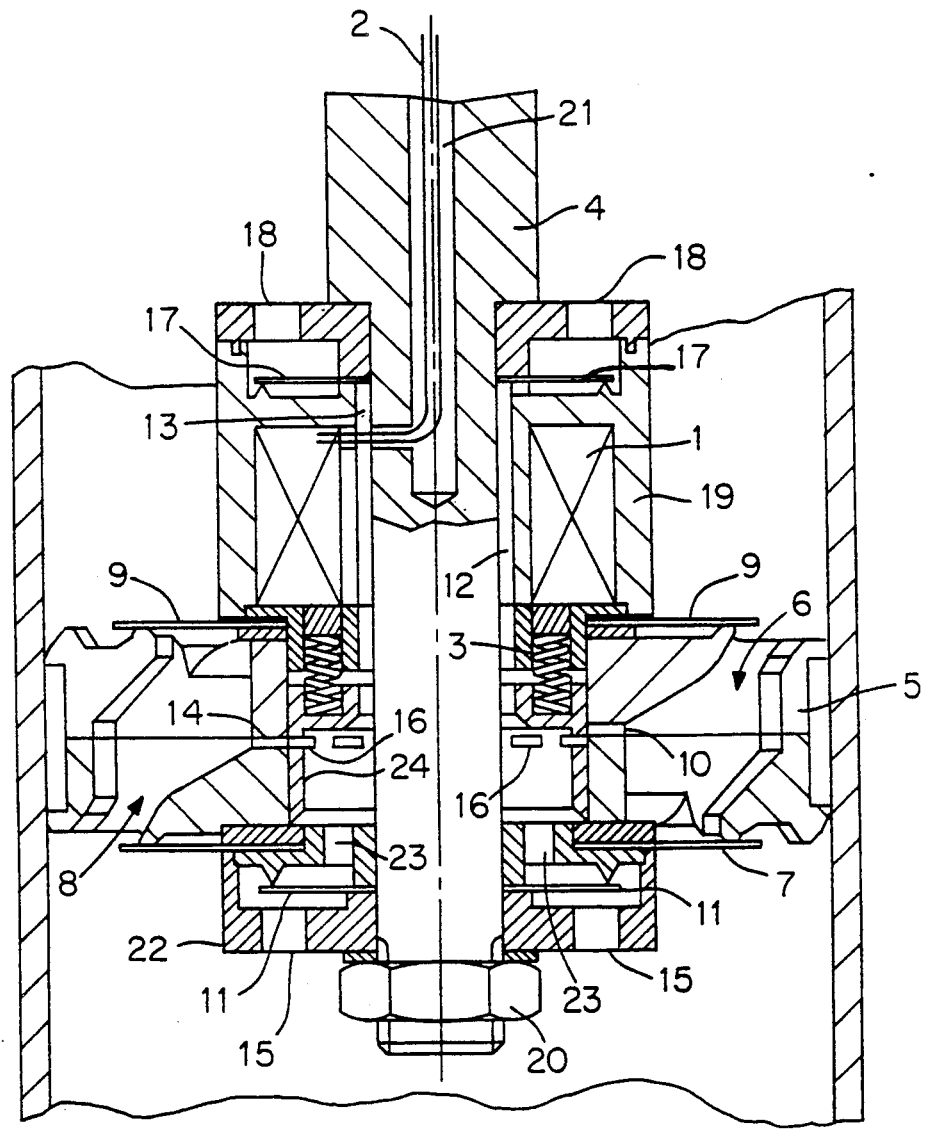

An attenuating piston 5 is secured to a piston rod 4 in the unillustrated housing of a vibration attenuator. The piston has main flow channels 6 for the suction stage and main flow channels 8 for the compression stage. Also provided are the valves associated with suction stage 7 and with compression stage 9. Extending axially above piston 5 is a housing 19 for the compression-stage bypass. A minimum bypass 12 and 13 extends along the piston rod and emerges above an axially resting electromagnet. The minimum bypass is closed off by a valve disk 17. The compression-stage attenuating fluid, oil, 11 can emerge from openings 18.

In the damping piston 5 the entire flow channel is formed through an input side and an output side of the main flow channel 6, 8. At each of the input parts of the flow channels, rectangular notches are arranged in the cross-section at the separating surface. These notches extend to the inner diameter of the piston and form a rectangular perforation with each opposite part. As a result, the controlled bypass channel 10 for the suction stage branches from the main flow channel 6 for the suction stage. The arrangement is the same as for the bypass channel 14 for the compression stage from the main flow channel 8 for the compression stage. With this arrangement, the bypass channels 10 are displaced with respect to the bypass channels 14 axially by an amount of the channel height. The valve slide 24 which operates as a spring-loaded armature in conjunction with the electromagnet 1, is guided directly at its outer diameter in the inner diameter of the damping piston 5. It opens or closes the bypass channels 10 for the suction stage or 14 for the compression stage, through its valve openings 16 dependent on the position of the valve slide 24.

Below piston 5 is another partial housing 22 for the suctionstage bypass. The fluid for the suction stage can flow into the bottom of partial housing 22 by way of perforations 23. Valve disks 11 govern the amount of oil that can flow out of outlets 15. The overall package, consisting of attenuation piston 5 and housing components 19 and 22 is secured by an attachment 20 below housing 22. Also still inside piston 5 is a valve slide 24 that travels back and forth axially and additionally controls the bypass. Valve slide 24 is secured in its base position by resilient structures 3, wherein it constantly ensures that one bypass is open. Valve slide 24 is a rotationally symmetrical turning with a very thin wall. Inside the wall are valve openings 16. The thinness of the wall is intended to decrease flow resistance. Valve openings 16 are designed to ensure a radial distribution of rectangular perforations over the total circumference. The oil can accordingly flow without friction and without increased resistance as would result from the capillary action involved with round perforations. The rectangular shape also makes valve openings 16 larger. Above the axially moving valve slide 24 and also extending axially is an electromagnet 1. The electric leads 2 to electromagnet 1 extend through a channel 21 in piston rod 4. When current flows through electromagnet 1, valve slide 24, which can also be considered an armature, becomes attractive, closing the previously open bypass and opening the previously closed bypass. This approach ensures that one bypass direction is always open and the other closed, meaning that the vibration attenuator's characteristic is always soft in one direction and hard in the other. If the supply of current to electromagnet 1 is discontinued or weakened, the armature will drop back into its base position and will remain there subject to the forces of resilient structures 3.

When the compression stage is opened for example, meaning that valve opening 16 is open, the fluid will flow through bypass channel 13 and against valve disk 17 and can emerge at exit 18. In this situation the compression stage is soft and the wheel can spring into place rapidly. Relatively little or no forces are transmitted to the body, which accordingly remains at rest. To prevent the wheel from continuing to vibrate as it would with a one-way valve, it is braked where the vibration reverses because the suction stage is hard in this direction. The vibration is accordingly rapidly attenuated. The invention ensures that both directions of motion will not be opened in any case. This approach results in another advantage in that the skyhook algorithm can be simplified in a semiactive chassis that employs the principle, eliminating the need for a sensor in some cases.

Electromagnet 1 is not always supplied with current, but is controlled by the attached computer.

If a semiactive chassis is to be fully exploited, the attenuation can assume no intermediate values, and can only switch between zero and maximum. This can be adequately done with the present invention. For practical purposes it is probably best to keep the vibration attenuator's compression stage always soft and its suction stage always hard. This would be very useful if an obstacle were suddenly encountered on the road for example. It is also possible to provide compression-stage and suction-stage cross-sections that differ in size.

The present invention will increase comfort in association with a semiactive chassis that operates on the skyhook principle. Vibrations are permitted but are attenuated once they occur, without being transmitted to the body.

I claim:

1. A bypass control vavlve for a regulated and controlled hydraulic vibration damper in a semi-active chassis for motor vehicles, comprising: a cylinder for holding a damping fluid; a piston rod having an inner end sealed into said cylinder and traveling reciprocating within said cylinder; a damping piston secured to said inner end and dividing the inside of said cylinder into two compartments; choke-valve elements for adjusting sizes of portions of passages in said damping piston; said piston rod through said traveling forming suction and compression stages in said cylinder; a bypass with a valve slide within said damping piston for bypassing said suction and compression stages; axial electromagnet means having a coil mounted above said damping piston, said coil having energized and de-energized states, said electromagnet means controlling said bypass and being a two-way magnetic valve having an armature comprising said valve slide and located inside said damping piston, only one of said suction and compression stages of said bypass being open in one of said two states of said electromagnet means and th eother one of said stages being closed.

2. A bypass control valve as defined in claim 1, wherein a bypass for the compression stage is always open when no current flows through said magnetic valve.

3. A bypass control valve as defined in claim 1, wherein said bypass has a cross-section that is variable with either the suction stage or the compression stage.

4. A bypass control valve as defined in claim 1, wherein said valve slide is a rotationally symmetrical member positioned axially by said piston rod.

5. A bypass control valve as defined in claim 1, wherein said valve slide has a substantially thin wall and does not resist substantially fluid flow.

6. A bypass control valve as defined in claim 1, wherein said valve slide has a rotationally symmetrical circumference, said valve slide having substantially large rectangular perforations around said rotationally symmetrical circumference.

7. A bypass control valve as defined in claim 1, wherein said bypass is controlled so that said bypass is always open when said compression stage is inactive.

8. A bypass control valve as defined in claim 1, including resilient elements for securing said valve slide in a base position opening said bypass to compression or suction, said electromagnet means having to overcome forces of said resilient elements while attracting said valve slide.

9. A bypass control valve as defined in claim 1, wherein said valve slide has an outer surface that is guided directly in an inner bore of said damping piston.

10. A bypass control valve as defined in claim 1, wherein damping fluid flows to said bypass through bypass channels branching from main flow channels of the damping piston to an inner bore of said pistion.

11. A bypass control valve as defined in claim 1, wherein said bypass channels for the compression stage and bypass channels for the suction stage are displaced in height relative to one another at said inner bore of said piston.

12. A bypass control valve for a regulated and controlled hydraulic vibration damper in a semi-active chassis for motor vehicles, comprising: a cylinder for holding a damping fluid; a piston rod having an inner end sealed into said cylinder and traveling reciprocating within said cylinder; a damping piston secured to said inner end and dividing the inside of said cylinder into two compartments; choke-valve elements for adjusting sizes of portions of passages in said damping piston; said piston rod through said traveling forming suction and compression stages in said cylinder; a bypass with a valve slide within said damping piston for bypassing said suction and compression stages; axial electromagnet means having a coil mounted above said damping piston, said coil having energized and de-energized states, said electromagnet means controlling said ypass and being a two-way magnetic valve having an armature comprising said valve slide and located inside said damping piston, only one of said suction and compression stages of said bypass being open in one of said two states of said electromagnet means and the other one of said stages being closed; said bypass for said compression stage being always open when no current flows through said coil; said bypass having a cross-section that is variable with either the suction stage or the compression stage; said valve slide being a rotationally symmetrical member positioned axially by said piston rod; said valve slide having a substantially thin wall; said valve slide having a rotationally symmetrical circumference, said valve slide having sbustantially large rectangular perforations around said rotationally symmetrical circumference; said bypass being controlled so that said bypass is always open when said compression stage is inactive; resilient elements for securing said valve slide in a base position opening said bypass to compression or suction, said electromagnet means having to overcome forces of said resilient elements while attracting said valve slide; said valve slide having an outer surface guided directly in an inner bore of said damping piston; damping fluid flowing to said bypass through bypass channels branching from main flow channels of said damping piston to an inner bore of said piston; said bypass channels for the compression stage and bypass channels for the suction stage being displaced in height relative to one another at said inner bore of said piston.

* * * * *